(12) United States Patent
Pun

(10) Patent No.: US 9,638,395 B2
(45) Date of Patent: May 2, 2017

(54) APPARATUS AND METHOD FOR USE IN DIFFERENT AMBIENT LIGHTING CONDITIONS

(75) Inventor: Hingwing Pun, Shatin (HK)

(73) Assignee: Nokia Technologies Oy, Espoo (FI)

( * ) Notice: Subject to any disclaimer, the term of this patent is extended or adjusted under 35 U.S.C. 154(b) by 70 days.

(21) Appl. No.: 14/401,592

(22) PCT Filed: May 31, 2012

(86) PCT No.: PCT/CN2012/076331
§ 371 (c)(1),
(2), (4) Date: Nov. 17, 2014

(87) PCT Pub. No.: WO2013/177775
PCT Pub. Date: Dec. 5, 2013

(65) Prior Publication Data
US 2015/0131291 A1    May 14, 2015

(51) Int. Cl.
*F21V 9/00* (2015.01)
*F21V 11/00* (2015.01)
(Continued)

(52) U.S. Cl.
CPC ............. *F21V 9/00* (2013.01); *G06F 3/0202* (2013.01); *H01H 13/83* (2013.01); *H04M 1/0266* (2013.01); *H01H 2219/0023* (2013.01); *H01H 2219/038* (2013.01); *H01H 2219/039* (2013.01); *H01H 2219/054* (2013.01); *H04M 1/22* (2013.01); *H04M 2250/12* (2013.01)

(58) Field of Classification Search
CPC .... F21V 9/00–9/16; G06F 3/02; H01H 13/83; H01H 2219/0023; H01H 2219/038; H01H 2219/039; H04M 1/22; G02B 5/23; G02B 6/243

USPC ............ 428/134; 362/293, 173, 23.01–23.22
See application file for complete search history.

(56) References Cited

U.S. PATENT DOCUMENTS 3,323,244 A * 6/1967 Schreiber ................ G09F 19/18
                                                       252/600
3,341,330 A * 9/1967 Foris ....................... G03C 1/685
                                                       359/242
(Continued)

FOREIGN PATENT DOCUMENTS

CN         1853070     10/2006
CN       101872245     10/2010
(Continued)

OTHER PUBLICATIONS

International Search Report and Written Opinion received for corresponding Patent Cooperation Treaty Application No. PCT/CN2012/076331, dated Mar. 7, 2013 12 pages.
(Continued)

*Primary Examiner* — Peggy Neils
*Assistant Examiner* — Erin Kryukova
(74) *Attorney, Agent, or Firm* — Harrington & Smith

(57) ABSTRACT

An apparatus comprises: an artificial visible light source (8); a layer of photochromic material (2) overlying the artificial light source (8); a layer of opaque material (4) overlying the layer of photochromic material; and one or more apertures (6) through the layer of opaque material (4). The apparatus and a method providing the apparatus are used in different ambient lighting conditions.

15 Claims, 2 Drawing Sheets

(51) Int. Cl.
*H01H 13/83* (2006.01)
*G06F 3/02* (2006.01)
*H04M 1/02* (2006.01)
*H04M 1/22* (2006.01)

(56) References Cited

U.S. PATENT DOCUMENTS

| | | | |
|---|---|---|---|
| 2007/0060013 A1* | 3/2007 | Schmidt | A63H 33/22 446/175 |
| 2007/0128972 A1* | 6/2007 | Schmidt | A63H 33/22 446/219 |
| 2007/0133983 A1 | 6/2007 | Traff | |
| 2008/0239195 A1* | 10/2008 | Nishio | G02F 1/133308 349/58 |
| 2008/0280652 A1 | 11/2008 | Marry et al. | |
| 2009/0269524 A1* | 10/2009 | Zhang | G02B 5/23 428/34.1 |
| 2011/0074690 A1 | 3/2011 | Broga et al. | |
| 2011/0133672 A1* | 6/2011 | Tsang | F21S 10/02 315/294 |
| 2011/0235481 A1 | 9/2011 | Matsushita et al. | |
| 2012/0171414 A1* | 7/2012 | Wieser | G06F 3/0202 428/134 |
| 2013/0208201 A1* | 8/2013 | Satoh | G02F 1/1334 349/33 |

FOREIGN PATENT DOCUMENTS

| | | |
|---|---|---|
| JP | 2011-203977 A | 10/2011 |
| KR | 1020030062127 | 7/2003 |
| KR | 2007-0071922 A | 7/2007 |
| TW | 200845073 A * | 11/2008 |
| TW | 200845073 A | 11/2008 |
| WO | 2009/109813 A1 | 9/2009 |

OTHER PUBLICATIONS

Extended European Search Report received for corresponding European Patent Application No. 12877973.3, dated Jan. 27, 2016, 6 pages.

* cited by examiner

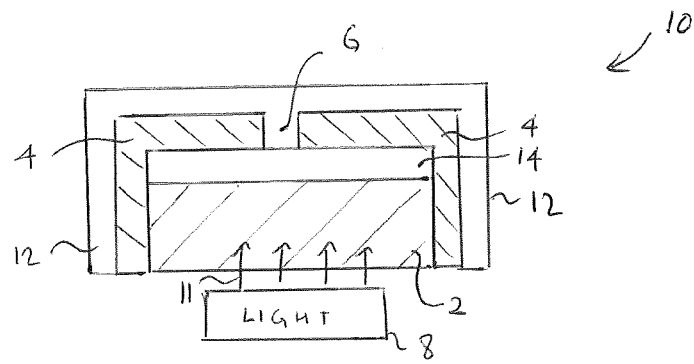
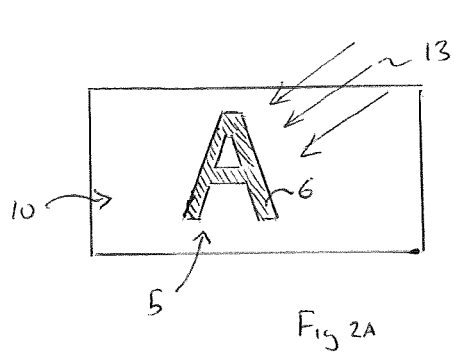
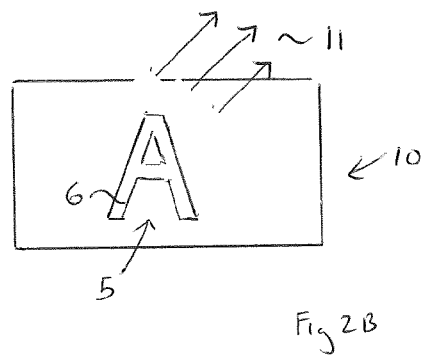
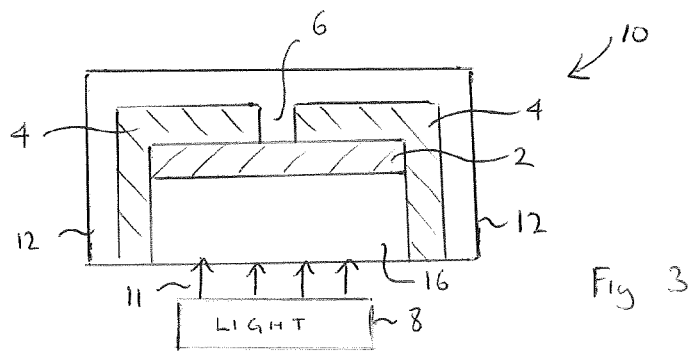
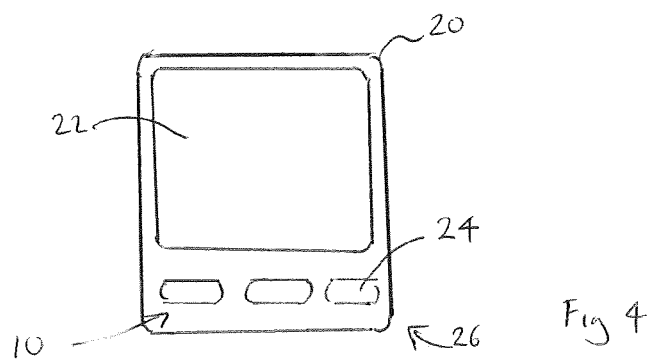

ID-APPARATUS AND METHOD FOR USE IN DIFFERENT AMBIENT LIGHTING CONDITIONS

RELATED APPLICATION

This application was originally filed as PCT Application No. PCT/CN2012/076331 filed May 31, 2012.

TECHNOLOGICAL FIELD

Embodiments of the present invention relate to an apparatus for use in different ambient lighting conditions.

BACKGROUND

An apparatus that is usable in certain ambient lighting conditions may not be easily usable in other ambient lighting conditions.

Examples of different ambient fighting conditions may, for example, include low lighting/darkness, strong sunlight, and artificial lighting.

BRIEF SUMMARY

According to various, but not necessarily all, embodiments of the invention there is provided an apparatus comprising: an artificial visible light source; a layer of photochromic material overlying the artificial light source; a layer of opaque material overlying the layer of photochromic material; and one or more apertures through the layer of opaque material.

According to various, but not necessarily all, embodiments of the invention there is provided a method comprising: providing an artificial visible light source; providing a layer of photochromic material as a filter for the artificial light produced by the artificial light source; and providing a layer of opaque material, with one or more apertures through the layer of opaque material, as a mask for the filtered artificial light.

BRIEF DESCRIPTION

For a better understanding of various examples of embodiments of the present invention reference will now be made by way of example only to the accompanying drawings in which:

FIG. 1 illustrates example of an apparatus that presents information to a user differently in different ambient lighting conditions;

FIG. 2A illustrates an example of an apparatus when the apparatus receives natural sunlight or ultraviolet light and information is presented by a contrast between photochromic material that is visible through aperture(s) in an opaque layer and the opaque layer;

FIG. 2B illustrates an example of the apparatus, illustrated in FIG. 2A, when the apparatus does not receive natural sunlight or ultraviolet light and information is presented by a contrast between backlit photochromic material that is visible through aperture(s) in the opaque layer and the opaque layer;

FIG. 3 illustrates another example of an apparatus that presents information to a user differently in different ambient lighting conditions;

FIG. 4 illustrates an example of a device comprising one or more apparatuses;

DETAILED DESCRIPTION

Figure 5A:
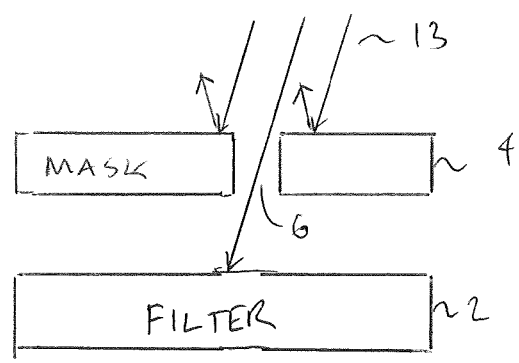
FIG. 5A illustrates photochromic material in the presence of ultraviolet light acting as a filter absorbing ambient visible light received via aperture(s) in the opaque layer.

The figures illustrate an apparatus 10 comprising: an artificial visible light source 8; a layer of photochromic material 2 overlying the artificial light source 8; a layer of opaque material 4 overlying the layer of photochromic material 2; and one or more apertures 6 through the layer of opaque material 4.

FIGS. 1 and 3 both illustrate examples of an apparatus 10 that presents information to a user differently in different ambient lighting conditions. The information may therefore be legible in different ambient lighting conditions.

The apparatus 10 comprises: an artificial visible light source 8; a layer of photochromic material 2 overlying the artificial light source 8; a layer of opaque material 4 overlying the layer of photochromic material 2; and one or more apertures 6 through the layer of opaque material 4.

When the apparatus 10 receives ambient natural sunlight 13 or ultraviolet light, as illustrated in FIG. 2A, information 5 is presented by a contrast between photochromic material 2 that is visible through one or more apertures 6 and a layer of opaque material 4 through which the one or more apertures 6 are made.

For example, as illustrated in FIG. 5A, the photochromic material 2 in the presence of ultraviolet light may act as a filter absorbing ambient visible light 13 received via aperture(s) 6 in the opaque material 4 giving the photochromic material a dark appearance or a black color.

The layer of opaque material 4 reflects at least some of the ambient visible light 13. The layer of opaque material 4 may be colored to contrast with the dark/black material 2. It may, for example, be colored white. The layer of opaque material 4, with the aperture(s) 6, forms a mask through which the dark photochromic material 2 can be seen. The apertures 6 in the mask are designed to convey information 5 by selectively presenting the dark photochromic material 2 through the mask aperture(s) 6.

When the apparatus 10 receives ambient artificial visible light 11 without ultraviolet light or receives no light, as illustrated in FIG. 2B, information 5 is presented by backlighting the photochromic material 2 through the one or more apertures 6 in the layer of opaque material 4.

Figure 5B:
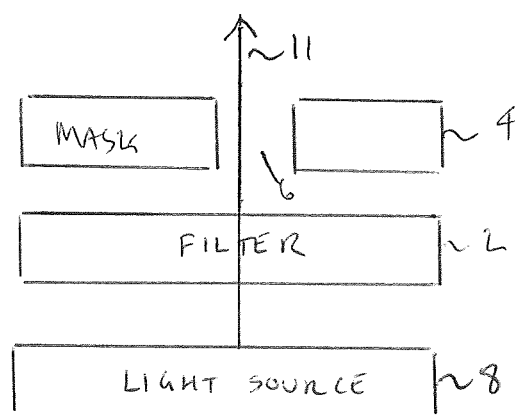
FIG. 5B illustrates photochromic material in the absence of ultraviolet light acting as a filter transmitting visible light generated by an underlying artificial visible light source.

For example, as illustrated in FIG. 5B, the photochromic material 2 in the absence of ultraviolet light (or sufficient ultraviolet light) may filter visible light 11 generated by an artificial visible light source 8. It may, for example, be transparent or translucent to visible light 11 generated by an artificial visible light source 8.

The layer of opaque material 4 may be colored to contrast with the filtered visible light 11. It may, for example, be colored white. The layer of opaque material 4, with the aperture(s) 6, therefore forms a mask through which the visible light 11 generated by an artificial visible light source 8 can be seen. The apertures 6 in the mask are designed to convey information 5 by selectively presenting the visible light 11 generated by the artificial visible light source 8 through the mask aperture(s).

The photochromic material 2 changes state in the presence of ultraviolet light. The change is reversible. The photochromic material 2 returns to its original state when the ultraviolet light is no longer present.

In the absence of (sufficient) ultraviolet light, the photochromic material 2 is transparent or translucent (FIG. 2B, 5B). Light produced by an artificial visible light source 8 that does not contain any or sufficient ultraviolet light can therefore pass through the photochromic material 2.

In the presence of (sufficient) ultraviolet light, the photochromic material 2 is opaque (FIG. 2A, 5A) and absorbs ambient visible light.

Thus the photochromic material 2 when exposed to only artificial light 11, for example, as produced by the artificial light source 8 is translucent to the artificial light 11. Whereas when the photochromic material 2 is exposed to natural sunlight it absorbs the natural sunlight appearing dark.

Referring back to FIG. 1, this example of the apparatus 10 comprises an artificial visible light source 8 underlying a layer of photochromic material 2. The light source 8 does not produce ultraviolet light. A layer of paint 14 covers at least partially an upper surface of the photochromic layer 2. The paint layer 14 provides an additional filter for the visible light 11 when it passes through the photochromic layer 2, the paint layer 14 and the aperture(s) 6 (FIGS. 2B and 5B).

A layer of opaque material 4 overlies the paint layer 14. There are one or more apertures 6 through the layer of opaque material 4. The layer of opaque material 4, and the aperture(s) 6, are in this example covered by a transparent overcoat 12, however, in other examples there may be no overcoat present.

The paint layer 14 is positioned between and in contact with the layer of opaque material 4 and the layer of photochromic material 2. The paint layer 14 may be semi-transparent white or any other suitable color. It is positioned to be back-lit by the artificial visible light source 8. In other examples there may be no paint layer.

Referring back to FIG. 3, this example of the apparatus 10 comprises an artificial visible light source 8 underlying a substrate 16 that supports on an upper surface a layer of photochromic material 2. The light source 8 does not produce ultraviolet light.

The photochromic layer 2 is a paint layer supported by the substrate 16. It is colored to provide additional filtering for the visible light 11 when it passes through the photochromic layer 2 and the aperture(s) 6 (FIGS. 2B and 5B).

A layer of opaque material 4 overlies the photochromic paint layer 2. There are one or more apertures 6 through the layer of opaque material 4. The layer of opaque material 4, and the aperture(s) 6, are covered by a transparent overcoat 6. In other examples there may be no overcoat.

The photochromic paint layer 2 is positioned between and in contact with the layer of opaque material 4 and the supporting substrate 16. The photochromic paint layer 2, when not exposed to ultraviolet light, may be semi-transparent white in the artificial visible light 11. It is positioned to be back-lit by the artificial visible light source 8.

It will be appreciated from the foregoing description of FIGS. 1, 2A, 2B, 3, 5A and 5B, that the apparatus 10 may be produced using a method of manufacture comprising: providing an artificial visible light source 8; providing a layer of photochromic material 2 as a filter for the artificial visible light 11 produced by the artificial light source 8; and providing a layer of opaque material 4, with one or more apertures 6 through the layer of opaque material 4, as a mask for the filtered artificial visible light 11.

FIG. 4 illustrates an example of a device 20 comprising one or more apparatuses 10. In this example, the device 20 is an electronic device with a user output 22 (e.g. a display) and a user input 26 (e.g. a key 24 or keys 24). In this example, the apparatus 10 provides a key 24 but in other example it may provide other functions and have different configurations. The information 5 presented by the apparatus 10 may indicate a function of the key 24. The artificial light source 8 may be a light emitting diode (or similar emissive device) or a light guide (or similar passive device).

The presentation of the information 5 changes in different ambient lighting conditions.

When the device 20 is exposed to sunlight, for example, the photochromic material 2 of the apparatus 10 changes state and absorbs at least some of the ambient sunlight making the aperture(s) 6 appear dark.

When the device 20 is not exposed to sunlight, for example, the photochromic material 2 of the apparatus 10 enables artificial light 11 from the artificial light source 8 to be transmitted through the aperture(s) 6.

The device 20 may, for example, be a mobile electronic device. It may, for example, be a hand-portable electronic device that is sized to be held in a palm of an adult human hand and to fit into an inside breast jacket pocket.

The device 20 may, for example, operate as one or more of a mobile cellular telephone, a personal media player, a navigation device, a camera device, a recording device, a data storage device, a personal digital assistant, a mobile computer etc.

Reference is made in this application to photochromic material 2. Known examples of photochromic material exist and are used, for example, in the production of light-reactive eyeglasses. Suitable examples of photochromic material 2 includes, but is not limited to, microcrystalline silver halides (e.g. silver halide) and organic photochromic molecules (e.g. oxazines and naphthopyrans).

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

What is claimed is:

1. An apparatus comprising:
   an artificial visible light source;
   a layer of photochromic material overlying the artificial light source;
   a layer of opaque material overlying the layer of photochromic material; and
   one or more apertures directly overlying the layer of photochromic material and extending through the layer of opaque material;
   wherein visible light from the artificial visible light source is emitted into only the layer of photochromic material, passes out of the layer of photochromic material and into only the one or more apertures, and is emitted out of only the one or more apertures.

2. An apparatus as claimed in claim 1, wherein the photochromic material undergoes a reversible change in color while exposed to ultraviolet light.

3. An apparatus as claimed in claim 1, wherein the photochromic material is configured such that, when the photochromic material is exposed to only artificial light produced by the artificial visible light source, the photochromic material is translucent to the artificial light, and the photochromic material is configured such that, when the photochromic material is exposed to natural sunlight, the photochromic material absorbs the natural sunlight such that the photochromic material appears dark.

4. An apparatus as claimed in claim 1, wherein the photochromic material changes from a transparent state to a black colored state in sunlight.

5. An apparatus as claimed in claim 1 wherein the layer of opaque material is colored white.

6. An apparatus as claimed in claim 1 wherein the layer of opaque material is covered by a transparent overcoat.

7. An apparatus as claimed in claim 1, wherein the photochromic material is a paint layer supported by a substrate.

8. An apparatus as claimed in claim 7, the layer of photochromic material contacts the layer of opaque material.

9. An apparatus as claimed in claim 7, wherein the paint layer is semi-transparent white.

10. An apparatus as claimed in claim 7, wherein the paint layer is back-lit by the artificial visible light source.

11. A method comprising:
providing an artificial visible light source;
providing a layer of photochromic material as a filter for the artificial light produced by the artificial light source; and
providing a layer of opaque material, with one or more apertures directly overlying the layer of photochromic material and extending through the layer of opaque material, as a mask for the filtered artificial light;
wherein the visible light from the artificial visible light source is emitted into only the layer of photochromic material, passes out of the layer of photochromic material and into only the one or more apertures, and is emitted out of only the one or more apertures.

12. A method as claimed in claim 11, wherein the photochromic material undergoes a reversible change in color while exposed to ultraviolet light.

13. A method as claimed in claim 11, wherein the photochromic material is configured such that, when the photochromic material is exposed to only artificial light produced by the artificial light source, the photochromic material is translucent to the artificial light, and the photochromic material is configured such that, when the photochromic material is exposed to natural sunlight, the photochromic material absorbs the natural sunlight such that the photochromic material appears dark.

14. A method as claimed in claim 11, wherein the photochromic material changes from a transparent state to a black colored state in sunlight.

15. A method as claimed in claim 11, wherein the artificial visible light source does not produce ultraviolet light.

* * * * *

UNITED STATES PATENT AND TRADEMARK OFFICE
CERTIFICATE OF CORRECTION

PATENT NO. : 9,638,395 B2  Page 1 of 1
APPLICATION NO. : 14/401592
DATED : May 2, 2017
INVENTOR(S) : Hingwing Pun It is certified that error appears in the above-identified patent and that said Letters Patent is hereby corrected as shown below:

In the Claims

In Claim 13:
Column 6, Line 20, "light" should be deleted and -- visible light -- should be inserted.

Signed and Sealed this
Thirteenth Day of June, 2017

Joseph Matal
*Performing the Functions and Duties of the*
*Under Secretary of Commerce for Intellectual Property and*
*Director of the United States Patent and Trademark Office*